Aug. 20, 1968     J. W. WILLIS     3,398,266
AERODYNAMIC COEFFICIENTS COMPUTER CIRCUIT
Filed Dec. 8, 1964                    2 Sheets-Sheet 1

INVENTOR
Joseph W. Willis

BY

ATTORNEY

United States Patent Office 3,398,266
Patented Aug. 20, 1968

3,398,266
AERODYNAMIC COEFFICIENTS
COMPUTER CIRCUIT
Joseph W. Willis, Kensington, Md., assignor to the United States of America as represented by the Secretary of the Navy
Filed Dec. 2, 1964, Ser. No. 415,544
6 Claims. (Cl. 235—150.2)

ABSTRACT OF THE DISCLOSURE

A computer circuit having a center-grounded input potentiometer with a pair of input terminals at its opposite ends and a pair of gaged movable output terminals engaging each half section thereof to simultaneously inversely vary the effective impedance of each half section. The output terminals are commonly connected to an output amplifier having a variable impedance feedback path.

---

Figure 1:
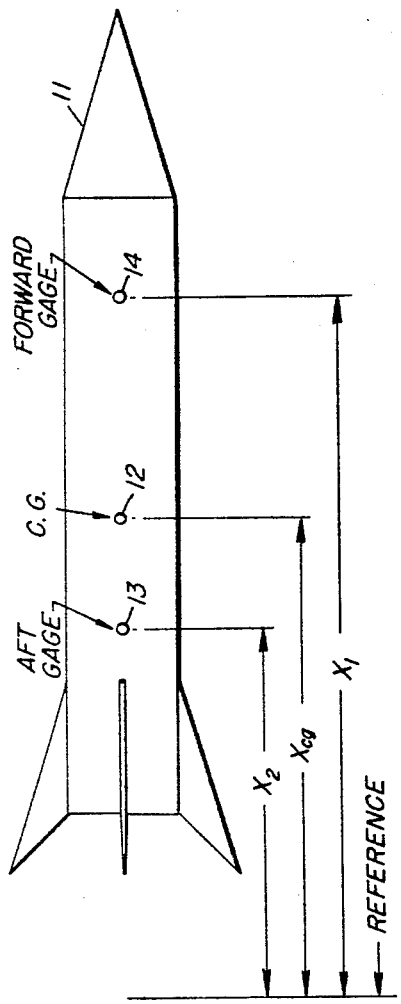

The invention described herein may be manufactured and used by or for the Government of the United States of America for governmental purposes without the payment of any royalties thereon or therefor.

The present invention relates generally to analog computer circuits and more particularly a circuit for computing aerodynamic coefficients wherein the choice of center of gravity with respect to model transducer locations is not restricted.

Previously analog computers have been used for determining force coefficients of calibration equations for wind tunnel tests on models wherein resistant strain gages were placed at appropriate locations on the models to provide outputs which were direct analogs of forces acting on them. One of the most critical problems confronting calibrators was the limitation imposed on them in their selection of centers of gravity near the strain gage locations when computing moment coefficients.

When prior art analog computer circuits for solving aerodynamic coefficient equations were used with a center of gravity near to any one of the strain gages, the computer became inoperative. This was because two of the constants in the equation which are directly proportional to the distance of the center of gravity from a strain gage appeared as a voltage analog ratio in a single resistor element which was an input to an amplifier in the computer circuit. Therefore when one of the constants approached zero, which was true when the center of gravity was close to a gage, the ratio approached infinity and caused the amplifier gain to go to infinity and saturation to occur. Thus, calibration of aerodynamic moment coefficients from calibration equations was severely limited because of the restriction in choices of center of gravity. With the use of the circuit of this invention, it is possible to select any center of gravity so that any ratio of equation constants can be realized without adversely effecting the computer performance.

Accordingly, it is an object of the present invention to provide a novel analog computer for determining aerodynamic coefficients of equations for wind tunnel test data.

A further object is the provision of an analog computer which is capable of determining both force aerodynamic coefficients and moment aerodynamic coefficients of equations for wind tunnel test data on model structures.

Another object is the provision of an analog computer circuit which will permit the ratio of aerodynamic coefficient equation constants to approach any value without limiting the computer performance, wherein the center of gravity of the test model may be selected at any location with respect to strain gages on the model, and wherein accurate and rapid solution of aerodynamic equations is achieved.

Figure 2:
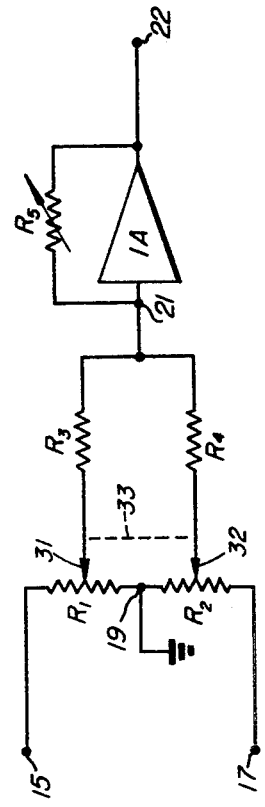

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates a schematic diagram of a test model;
FIG. 2 is a simplified schematic diagram of the analog computer circuit; and
FIG. 3 shows a preferred analog computer for computing aerodynamic coefficients.

Referring now to FIG. 1 of the drawings, illustrating an aerodynamic test model 11, a forward strain gage 14 is shown placed at a distance $X_1$ from a reference position on the model. The center of gravity 12 is located a distance $X_{cq}$ from the reference position and an aft strain gage 13 is located a distance $X_2$ from the reference position. The strain gages may be of the type shown in U.S. Patent 3,095,735, issued Apr. 14, 1960.

An analog computer circuit used in computing moment coefficients is shown in FIG. 2. The inputs 15 and 17 are inputs from the strain gages of FIG. 1. Resistors $R_1$ and $R_2$ which may each have values of 10,000 ohms are center tapped at point 19 to ground. Dual ganged contacts 31 and 32 are mechanically linked together at linkage 33 such that the adjustment of $R_1$ and $R_2$ vary in opposite directions. Contacts 31 and 32 are electrically joined together through resistors $R_3$ and $R_4$, which may have values of 50,000 ohms each, to a common input terminal 21 of a high gain amplifier 1A. A feedback resistor $R_5$, which may have a value of 100,000 ohms, is connected between the output terminal 22 and the amplifier input 21.

Figure 3:
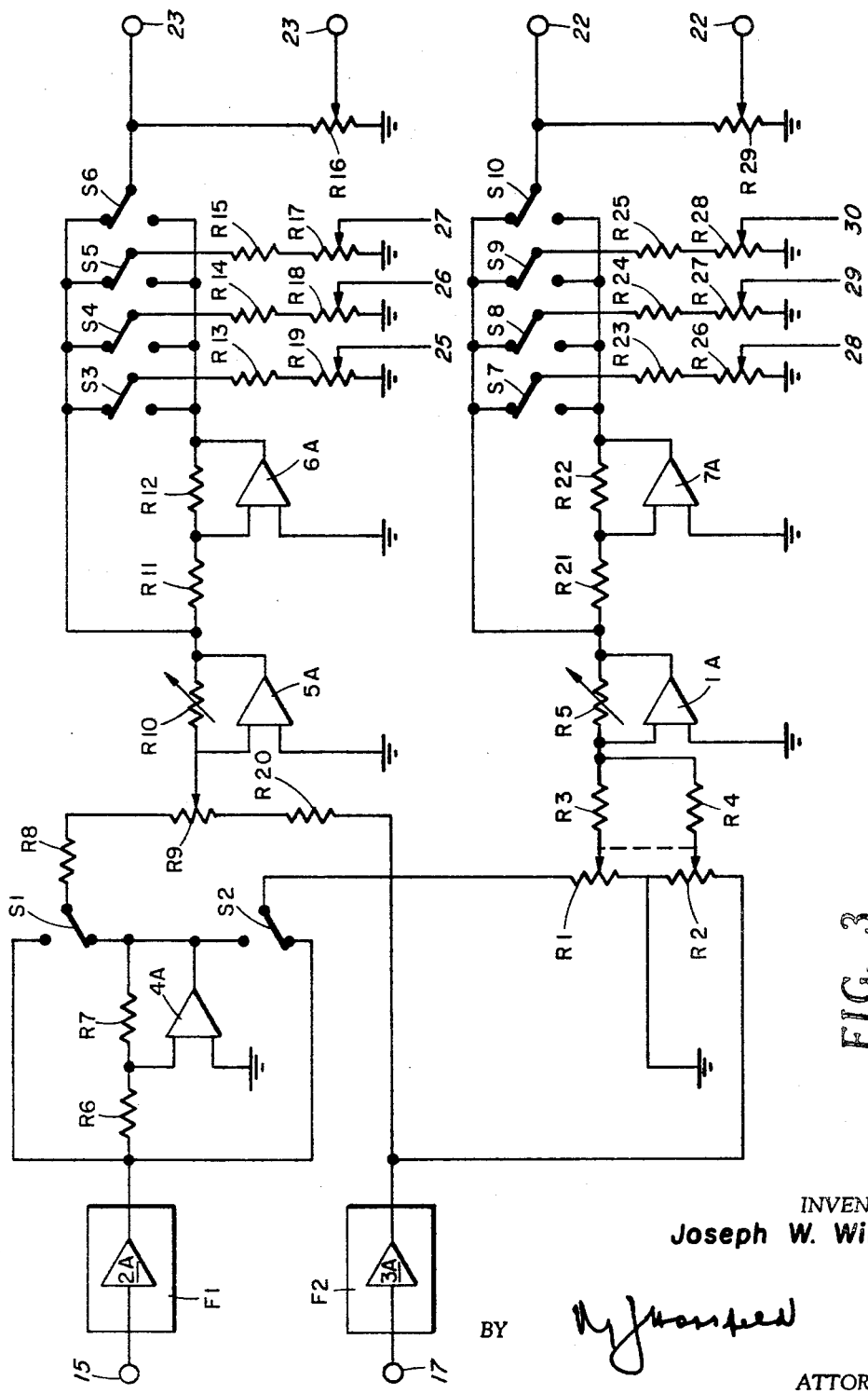

Referring now to FIG. 3 of the drawings, in which detained circuitry of the analog computer incorporating the circuitry of FIG. 2 is illustrated, moment coefficient output terminals 22 and force coefficient output terminals 23 are connected to an analog computer having strain gage input signal terminals 15 and 17. Input terminal 15 receives voltage signals from strain gage 14 in the forward portion of model 11 and input terminal 17 receives voltage signals from strain gage in the aft portion of the model. Each strain gage or transducer signal to the computer is fed through filters $F_1$ and $F_2$, respectively, to eliminate any transients or pickup noise. The filters may be of the active second order low pass variety with natural frequencies of either two cycles per second or 20 cycles per second and having unity gain amplifiers 2A and 3A. After passing through the filters, the input signals are fed to potentiometer circuits $R_9$ and $R_1-R_2$, respectively. The potentiometer $R_9$ which may have a value of 30,000 ohms is variable with one output contact to an output channel for providing normal force coefficient analog output signals. The potentiometer circuit $R_1-R_2$ is the type shown in FIG. 2 for computing moment coefficients. Resistors $R_{20}$ and $R_8$, which may each be 35,000 ohms, are in series with potentiometer circuit $R_9$. The two potentiometer circuits are connected together at a point between resistors $R_2$ and $R_{20}$.

Some of the equations for aerodynamic coefficients have a negative sign associated with the equation constant which is multiplied by the forward strain gage signal. To provide the negative sign when the gages are wired to give the same polarity, an inverter circuit consisting of resistors $R_6$, $R_7$, and amplifier 4A may be selectively inserted in series with either of the potentiometer circuits, by moving switch $S_1$ down or switch $S_2$ up.

In the event the two gages are not wired to give the same polarity, either switch $S_1$ or $S_2$ allows the inverter to be bypassed. In either case, the output of the aft gage 13 is supplied directly to the potentiometer circuits.

The output amplification channels from the potentiometer contacts are identical. Amplifiers 1A and 5A are high gain amplifiers and are connected in series with second stage amplifiers 6A and 7A, respectively. Resistors $R_5$, $R_{10}$, $R_{12}$, and $R_{22}$ are feedback resistors with resistors $R_5$ and $R_{10}$ being variable as described in FIG. 2. Resistors $R_{11}$ in the upper channel and $R_{21}$ in the lower channel, connect the first output stage amplifier to the second stage in respective output channels. Switches $S_3$–$S_{10}$ are polarity switches for outputs 25–30. Outputs 25–30 are proportional to the normal force and moment coefficients and independently variable by resistors $R_{17}$–$R_{19}$ and $R_{26}$–$R_{28}$. The voltage representing a normal force coefficient may be taken off either resistor $R_{16}$ or upper output terminal 23. The voltage representing the moment coefficient may be taken off either resistor $R_{29}$ or upper output terminal 22.

Referring to FIGURES 1, 2 and 3, for the functional operation of the invention with respect to the aerodynamic coefficients of the pitching moment, for example, the voltages $H_1$, $H_2$ are developed in the strain gages 14 and 13, respectively, and provide input voltages to the analog computer described in FIG. 3. For a complete description of the computer operation for force coefficients, reference may be made to the above mentioned U.S. patent. It should be understood that during a wind tunnel test, coefficients of other calibration equations for moments such as yawing moment may be computed.

A calibration equation for a pitching moment may be written as follows:

$$C_m = \frac{1}{qAd}[A_m H_1 + B_m H_2]$$

where: $C_m$ = a pitching moment coefficient; $qAd$ = constants determined by tunnel conditions in the body configuration; $A_m$, $B_m$ = constants determined by gage factors, gage locations, and the center of gravity location; $H_1$, $H_2$ = output signals from forward and aft pitch gages, respectively. Constants $A_m$ and $B_m$ are proportional to the distances from the center of gravity as illustrated in FIG. 1 wherein $$A_m = K_1\left(\frac{X_{cg}-X_2}{X_1-X_2}\right) \quad B_m = K_2\left(\frac{X_1-X_{cg}}{X_1-X_2}\right)$$

where: $K_1$, $K_2$ equals gage constants for forward and aft pitch gages, respectively; $X_1$, $X_2$ and $X_{cg}$ = locations of the pitch gages and the center of gravity from a reference position as illustrated in FIG. 1. It therefore follows that the ratio $$\frac{B_m}{A_m} = \frac{K_2}{K_1}\left(\frac{X_1-X_{cg}}{X_{cg}-X_2}\right)$$

In the circuit of FIG. 2, feedback resistor $R_5$ represents $1/qAd$; the resistor $R_1$ represents $A_m$; and resistor $R_2$ represents $B_m$. In addition to gage sensitivity and spacing, these constants are functions of the spacing between each gage and the point about which the moment is to be computed. Thus, if the center of gravity is located directly over the aft pitch gage ($H_2$) a constant $A_m$ becomes "0" and $B_m$ = "1." It can be readily appreciated that the circuit such as the one shown in FIG. 3 for the normal force coefficients will not permit setting a factor of "0" without driving the amplifier into overload. In the circuit of FIG. 2, the constants are determined by taking proportions of each of the input signals $H_1$ and $H_2$ rather than by series resistors with the two potentiometers ganged together one constant can approach "0" while the other approaches "1." It should be noted that it is a ratio of the two constants that is of more significance than the absolute value of either. The ratio can be any value between zero and infinity without driving the amplifier into overload.

With the use of the apparatus of this invention, it is now posisble to compute with an analog computer aerodynamic coefficients for moments as well as for forces without being limited in the choice of location of the center of gravity with respect to strain gages on the model.

Obviously many modifications and variations of the present invention are possible in the light of the above teachings. It is therefore to be understood, that within the scope of the appended claims, the invention may be practiced otherwise than as specifically described.

What is claimed and is desired to be secured by Letters Patent of the United States is:

1. In an analogue computer, a computing circuit for determining coefficients of an aerodynamic calibration equation having model constants and wind force variables for wind tunnel data on test models comprising, a dual ganged potentiometer having first and second input terminals for receiving electrical signals generated by strain gages indicative of wind force strains on said test model, a grounded center tap on said poteniometer dividing said potentiometer into two equal resistance elements, two movable output taps connected one to each resistance element for setting the ratio of the resistances of said elements to a value indicative of the ratio of two constants in the calibration equation, said taps electrically connected to provide a single output therefrom, and a variable feedback amplifier having an input terminal and an output terminal, said input terminal connected to said potentiometer output and said amplifier responsive to input signals for producing an amplified output signal on said output terminal, whereby analog wind force signals are combined and amplified to produce an output signal which is a direct analog of an aerodynamic coefficient for a calibration equation.

2. In an analog computer for determining moment coefficients from a calibration equation for aerodynamic models in wind tunnel test environments where the model center of gravity may be located anywhere with respect to model transducers thereon, said equation having at least two constants proportional to the distance of said center of gravity from said transducer, said computer comprising a first electrical strain gage located on the forward portion of said model with respect to a selected center of gravity for producing signal voltages of structural strain in the forward portion of said model, a second strain gage located on the aft portion of said model with respect to a selected center of gravity for producing signal voltages indicative of structural strain in the aft portion of said model, an analog circuit for a pitching moment coefficient calibration equation including, a first input channel connected to the first strain gage and a second input channel connected to the second gage, an output computing amplifier having an input terminal and an output terminal for producing a stable output signal indicative of said moment coefficient in response to signal voltages from said gages.

an adjustable feedback resistor connected between said amplifier input and output terminals, said feedback resistor adjustable to a value representing a constant in said equation which is determined by tunnel conditions and model configuration, a potentiometer circuit connected between said channel inputs and grounded at the midpoint thereof, having two equal resistance elements and two movable output taps, said taps connected one to each of said elements and mechanically linked together for producing inversely proportional resistance changes in said resistance elements such that the value of the ratio of said elements is indicative of the ratio of the equation constants determined by the relative positiions of said gages with respect to the model center of gravity.

first and second resistors connected one to each movable tap joining said movable taps to a common input at said amplifier input terminal, whereby said analog computer has a stable output representing the model pitching moment coefficient irrespective of the location of said gages with respect to the center of gravity of said model.

3. An analog computer for determining moment coefficients of aerodynamic calibration equations for wind tunnel test model data comprising a first electrical strain gage adapted to be mounted on the forward portion of the test model structure, a second electrical strain gage adapted to be mounted on the aft portion of a test model structure, both of said strain gages producing voltage signals indicative of the strain on structural members, first input channel in said computer for receiving voltage signals from said first strain gage, a second input channel in said computer for receiving voltage signals from said second strain gage, a polarity-reversing operational amplifier in only one of said channels having a gain of unity operable to reverse the polarity of signals applied thereto, a dual ganged potentiometer circuit having a first input terminal, a second input terminal, an output terminal, a first resistor connected to said first input terminal, a second resistor connected to said second input terminal, and adjusting means connected between said resistors and said output terminal, the high gain amplifier unit having an input terminal connected to said potentiometer output terminal, and an output terminal, said amplifier unit responsive to input signals for producing output signals indicative of an aerodynamic equation coefficient, and means including said polarity reversing amplifier for connecting said first and second input channels to said first and second potentiometer input terminals respectively.

4. An analog computer circuit for determining moment coefficients of aerodynamic calibration equations for wind tunnel data on test models having strain gages located forward and aft of the center of gravity of a model comprising, a dual ganged potentiometer circuit having two input terminals and an output terminal, said input terminals providing inputs for electrical signals indicative of wind force strain on a test model, said circuit including a resistor connected to said input terminals having a ground center tap dividing said resistor into two variable resistance elements, and movable taps connected one to each of said elements, each of said variable resistance elements adjustable by said taps to an analog voltage value representing a calibration equation constant which is proportional to the distance of a strain gage from the center of gravity of said model, and each of said taps mechanically interconnected such that resistance changes in one of said elements produce proportional changes in the opposite direction in the other of said elements, said taps electrically connected to said potentiometer output terminal to provide an output signal for any ratio of said constants, a high gain amplifier having an input terminal and an output terminal, a feedback resistor connected between said amplifier input and output terminals, said feedback resistor adjustable to a value representing an additional constant in said calibration equation, and means connecting said potentiometer output terminal to said amplifier input terminal to produce an output voltage indicative of an aerodynamic moment coefficient irrespective of the distance of a strain gage from the center of gravity on a test model.

5. In an analog computer for determining force aerodynamic coefficients and moment aerodynamic coefficients of calibration equations for wind tunnel test data on model structures comprising a first input channel for receiving input voltage signals indicative of force strains on a first section of a model structure, a second input terminal for receiving input voltage signals indicative of the force strains on a second section of a model structure, a first low pass filter included in said first channel, a second low pass filter inserted in said second channel, a polarity reversing amplifier unit having a gain of unity connected to said first filter and operable to reverse the polarity of a signal applied thereto, means including said polarity reversible amplifier for interconnecting said first and second input channels, said interconnecting means further including a first potentiometer circuit and a second potentiometer circuit, said first potentiometer circuit comprising an adjustable resistor which is adjusted to a value representing a normal force equation constant having a single output therefrom, said second potentiometer circuit comprising resistor, means dual ganged movable taps, and an output terminal, said resistor means having a center tap dividing said resistor means into two equal resistance elements, said elements settable by said taps to values representative of moment equation constants, and said taps electrically connected to a common output terminal for producing output signals therefrom, a first output amplifier connected to the output of said first potentiometer circuit for amplifying signals to provide a voltage signal output indicative of a force coefficient, and a second output amplifier connected to the output of said second potentiometer circuit for amplifying signals to provide a voltage signal output indicative of a moment equation coefficient.

6. In an analog computer for determining force aerodynamic coefficients and moment aerodynamic coefficients of calibration equations for wind tunnel test data on model structures comprising a first input channel for receiving input voltage signals indicative of force strains on a first section of a model structure, a second input channel for receiving input voltage signals indicative of the force strains on a second section of a model structure, means interconnecting said first and second input channels, said interconnecting means also including a first potentiometer circuit and a second potentiometer circuit, said first potentiometer circuit comprising an adjustable resistor and a movable output tap for adjusting said resistor to a value representing a normal force equation constant, said second potentiometer circuit comprising resistor means, divided into two equal resistance elements at the midpoint thereof, dual ganged movable taps connected one to each of said resistance elements for setting said elements to values representative of moment equation constants, and a common output terminal for electrically connecting said taps, a first output amplifier connected to the output of said first potentiometer circuit for amplifying signals to provide a voltage signal output indicative of an aerodynamic force coefficient, and a second output amplifier connected to the output of said second potentiometer circuit for amplifying signals to provide a voltage signal output indicative of a moment equation coefficient.

References Cited

UNITED STATES PATENTS 3,095,735   7/1963   Menzel _____ 73—147

MALCOLM A. MORRISON, *Primary Examiner.*

MARTIN P. HARTMAN, *Assistant Examiner.*